March 20, 1951     C. E. SPANG     2,546,113
ARM SCOOP
Filed May 2, 1947
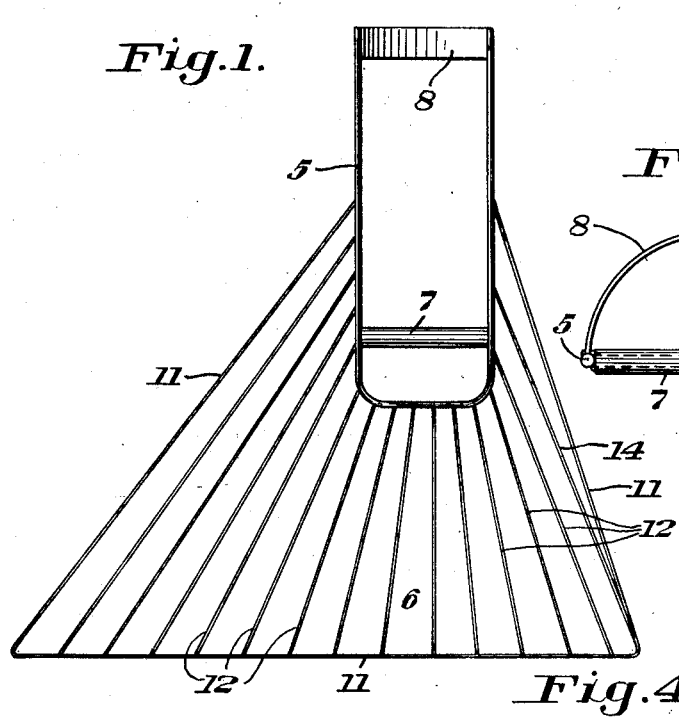
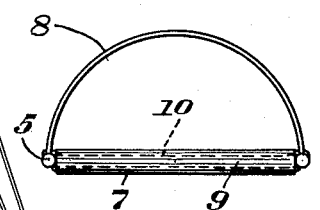
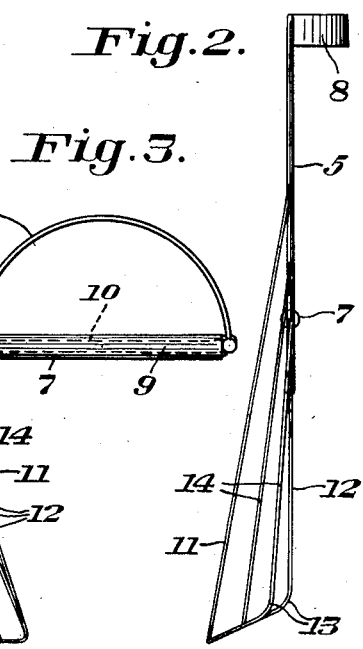
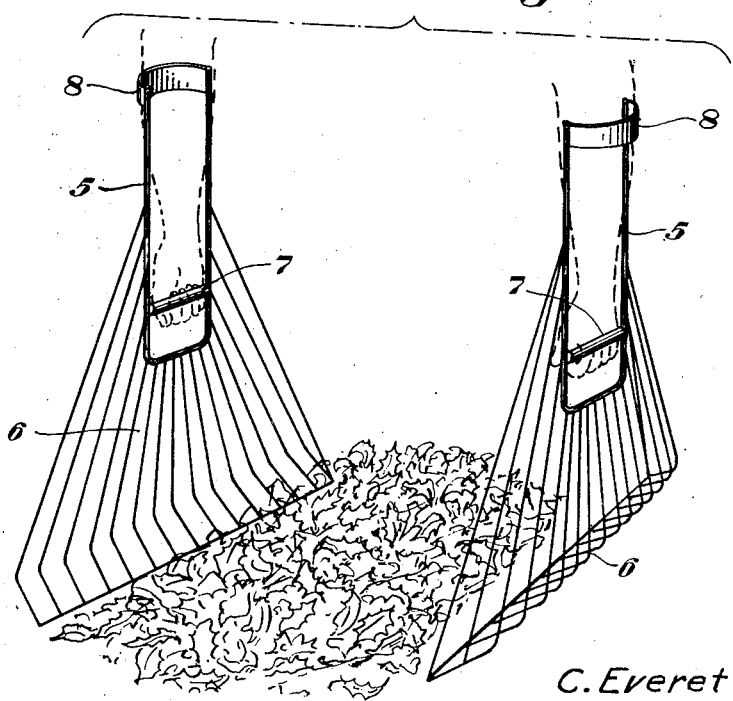
INVENTOR
C. Everette Spang
by his attys.
Stebbins Blenko & Webb Patented Mar. 20, 1951

2,546,113

UNITED STATES PATENT OFFICE 2,546,113

ARM SCOOP

Clarence Everette Spang, Butler, Pa.

Application May 2, 1947, Serial No. 745,381

1 Claim. (Cl. 294—1)

This application relates to an arm scoop which is useful for gathering together, lifting and transporting large quantities of small loose articles such as leaves, stalks, twigs, rubbish, etc. It is intended for use in pairs, the user engaging and manipulating a scoop with each of his hands and forearms.

When small loose material such as leaves, twigs, etc. have been raked into a pile it is difficult to pick them up and place them in a receptacle or to transport them. The length of the handle of the usual rake is so long as to make it awkward for picking up the material and the teeth of the rake do not provide sufficient area to support large quantities of small loose articles. Using a scoop constructed in accordance with my invention, a gardener or farmer can readily pick up and transport large quantities of such articles. The scoop can also be used to scrape up leaves, twigs, etc. into a sufficiently large pile for lifting and transporting.

In the accompanying drawings I have illustrated a present preferred embodiment of my invention in which Figure 1 is a front elevation view; Figure 2 is a side view; and Figure 3 is a plan view of my arm scoop; and Figure 4 is a schematic view showing the manner in which a pair of my scoops may be used.

An arm scoop constructed in accordance with my invention comprises a handle 5 and a body portion which is in the form of a basket of triangular shape designated generally by the reference numeral 6. The handle has a hand grip 7 and an arm brace 8.

The handle 5 is made from a rod bent into the form of a U. Figure 3 shows one way in which the hand grip 7 may be secured to the handle. A length of pipe 9 is passed over a rod 10 which is of sufficient length to reach both sides of the handle. The pipe and rod are then placed in proper position in the U of the handle and the rod 10 is welded thereto.

The arm brace 8 is formed from a flat strip which is curved to form a semi-circle as shown in Figure 3 of the drawings. The ends of the strip are also welded to the legs of the U-shaped bar forming the handle 5. The arm brace 8 should be so spaced from the hand grip 7 on the handle that when the user grasps the hand grip in his hand the brace 8 presses against the user's forearm just below his elbow.

The scoop body 6 is made of wires which are welded to the handle 5 and to each other to form a shallow triangularly-shaped basket. A wire 11 is bent into a triangle to form the edge of the basket, the ends of the wire being welded to opposite sides of the handle 5. As shown in Figure 2 the wire lies in a plane which forms an angle with the plane of the handle. Additional wires 12 are welded to the handle and to the wire 11. They are spaced around the handle and along the side of the triangle formed by the wire 11 which is opposite to the handle 5. The wires 12 extend in the general plane of the handle for the greater portion of their length, and are then bent as at 13 so that their ends can be secured to the wire 11. Additional wires 14 may extend between the handle and the bent portion of the two outside wires of the wires 12 to reinforce these wires and to fill in the sides of the basket. It is not necessary that the wires 12 be bent. The handle 5, the wire 11 and the wires 12 may all lie in the same general plane and thus form a flat scoop body.

Figure 4 shows the manner in which my arm scoop may be employed. After a pile of leaves, twigs, etc. has been gathered together, the gardener or farmer grasps a scoop in each hand and brings the scoops together to pick up the material. The hand grips 7 enable the gardener to guide the scoops while the arm braces 8 press against his forearms and thus prevent the scoops from turning in his hand. The portion of the wire 11 which forms the base of the triangle stiffens the wires 12 thus forming a strong structure with which large quantities of material can be lifted. This portion of the wire 11 is also useful when the scoop is used to gather the leaves or other loose material into a pile. It prevents the wires 12 from catching on roots, tufts of grass, etc. and picks up material which otherwise would pass between the wires 12.

The construction of the scoop is designed so that the scoop is light in weight, but still possesses sufficient rigidity to handle large quantities of material. I have shown the scoop as made of steel wires and rods welded together, but it may be made of other materials such as wood, which might make an even lighter construction.

In the drawings I have shown relatively short scoops which require the user to bend over slightly when he picks up the loose material, but which are convenient for discharging material into a low receptacle such as a wheelbarrow. However, my scoop can be made of any desired length simply by increasing the length of the handle 5, and placing the hand grip and the arm brace at appropriate positions along the handle.

While I have illustrated and described a present preferred embodiment of my invention it is to be distinctly understood that it may be otherwise embodied within the scope of the following claim.

I claim:

An arm scoop comprising a handle, a hand grip on the handle, an arm brace on the handle and spaced from the hand grip, and a generally triangularly-shaped scoop body secured to the portion of the handle nearest the hand grip, the greater portion of the scoop body lying on one side of a line drawn through the longitudinal axis of the handle.

C. EVERETTE SPANG.

REFERENCES CITED

The following references are of record in the file of this patent:

UNITED STATES PATENTS

| Number | Name | Date |
| --- | --- | --- |
| 1,160,282 | Harris et al. | Nov. 16, 1915 |
| 2,180,544 | Nissen | Nov. 21, 1939 |